(12) United States Patent
Gopal et al.

(10) Patent No.: US 11,271,612 B2
(45) Date of Patent: Mar. 8, 2022

(54) ANTENNA SWITCH SCHEDULING

(71) Applicant: QUALCOMM Incorporated, San Diego, CA (US)

(72) Inventors: Thawatt Gopal, San Diego, CA (US); Scott Hoover, Del Mar, CA (US); Defang Chen, San Diego, CA (US); Sridhar Bandaru, Westminster, CO (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 16/557,783

(22) Filed: Aug. 30, 2019

(65) Prior Publication Data
US 2021/0067209 A1 Mar. 4, 2021

(51) Int. Cl.
| | | |
|---|---|---|
| H04B 7/0404 | (2017.01) | |
| H04L 5/00 | (2006.01) | |
| H04W 52/02 | (2009.01) | |
| H04W 52/24 | (2009.01) | |
| H04W 72/04 | (2009.01) | |
| H04W 72/08 | (2009.01) | |

(52) U.S. Cl.
CPC ......... *H04B 7/0404* (2013.01); *H04L 5/0032* (2013.01); *H04W 52/0216* (2013.01); *H04W 52/241* (2013.01); *H04W 72/0446* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 7,016,320 | B1* | 3/2006 | Petersson | H04W 52/40 370/331 |
| 9,247,578 | B2* | 1/2016 | Su | H04W 36/36 |
| 10,291,310 | B1* | 5/2019 | Gopal | H04B 7/0817 |
| 10,623,239 | B1* | 4/2020 | Li | H04B 17/382 |
| 10,840,995 | B1* | 11/2020 | Luong | H04R 3/12 |
| 10,998,986 | B2* | 5/2021 | Seong | H04B 17/336 |
| 2001/0038356 | A1* | 11/2001 | Frank | H04B 7/0632 343/853 |
| 2001/0055959 | A1* | 12/2001 | Shen | H04B 7/0811 455/277.1 |
| 2002/0058488 | A1* | 5/2002 | Miyahara | H04B 7/0814 455/277.2 |

(Continued)

FOREIGN PATENT DOCUMENTS

WO 2019096248 A1 5/2019

OTHER PUBLICATIONS

International Search Report and Written Opinion—PCT/US2020/048588—ISA/EPO—dated Oct. 30, 2020.

*Primary Examiner* — Christopher T Wyllie
(74) *Attorney, Agent, or Firm* — Qualcomm Incorporated

(57) ABSTRACT

Methods, systems, and devices for wireless communication are described. A multi-antenna user equipment (UE) may communicate with a base station using a first antenna, determine to switch from the first antenna to a second antenna for communicating with the base station, determine a silence window in which communication with the base station is suspended, schedule the switch from the first antenna to the second antenna to occur during the silence window, and switch from the first antenna to the second antenna during the silence window.

27 Claims, 12 Drawing Sheets

(56) References Cited

U.S. PATENT DOCUMENTS

| | | | |
|---|---|---|---|
| 2004/0028009 A1* | 2/2004 | Dorenbosch | H04W 36/0011 370/329 |
| 2004/0179491 A1* | 9/2004 | Hosomi | H04B 7/0805 370/329 |
| 2007/0178876 A1* | 8/2007 | Yaqub | H04W 76/28 455/343.1 |
| 2009/0186614 A1* | 7/2009 | Aoyama | H04W 76/28 455/436 |
| 2011/0281570 A1* | 11/2011 | Shi | H04W 24/10 455/418 |
| 2011/0311001 A1* | 12/2011 | Lindenbauer | H04B 7/0814 375/340 |
| 2012/0295555 A1* | 11/2012 | Greene | H01Q 5/314 455/77 |
| 2013/0005272 A1* | 1/2013 | Shah | H04B 1/70754 455/67.11 |
| 2013/0155890 A1* | 6/2013 | Bhattad | H04B 7/0802 370/252 |
| 2013/0222515 A1* | 8/2013 | Abuan | H04W 40/12 348/14.01 |
| 2013/0244719 A1* | 9/2013 | Nukala | H04W 56/0005 455/550.1 |
| 2013/0322562 A1* | 12/2013 | Zhang | H04B 7/0404 375/267 |
| 2014/0004802 A1* | 1/2014 | Ljung | H04B 7/0811 455/73 |
| 2014/0120925 A1* | 5/2014 | Kanthala | H04W 8/183 455/450 |
| 2014/0199952 A1* | 7/2014 | Sandhu | H04B 1/02 455/91 |
| 2014/0199992 A1* | 7/2014 | Chincholi | H04W 24/10 455/422.1 |
| 2014/0341125 A1* | 11/2014 | Dayal | H04B 7/0814 370/329 |
| 2015/0311986 A1* | 10/2015 | Thomas | H04L 27/22 375/230 |
| 2015/0312788 A1* | 10/2015 | Delsol | H04W 24/10 370/252 |
| 2016/0248908 A1* | 8/2016 | Kanamarlapudi | H04M 3/2236 |
| 2017/0054470 A1* | 2/2017 | Reza | H04L 5/0048 |
| 2019/0174373 A1* | 6/2019 | Kanazawa | H04W 36/08 |
| 2020/0052853 A1 | 2/2020 | Qin et al. | |
| 2020/0367122 A1* | 11/2020 | Breuer | H04W 36/08 |

* cited by examiner

ANTENNA SWITCH SCHEDULING

BACKGROUND

Field of the Disclosure

The following relates generally to wireless communication, and more specifically to antenna switch scheduling in a multi-antenna user equipment (UE).

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as E-UTRA, or Long Term Evolution (LTE) or LTE-Advanced (LTE-A), systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Generally, base stations and UEs communicate via transmissions on forward and reverse links. A forward link (or downlink) refers to the communication link from a base station to a UE, and the reverse link (or uplink) refers to the communication link from the UE to the base station. The forward and/or reverse links may be established via single-in-single-out (SISO), multiple-in-single-out (MISO), or a multiple-in-multiple-out (MIMO) system. In devices utilizing multiple antennas, algorithms may exist for switching between antennas to achieve a desired performance (e.g., to switch from using a certain antenna that may be blocked by how a device is held). Moreover, some UEs may be configured to communicate with base stations using multiple radio access technologies, such as in an E-UTRA New Radio-Dual Connectivity (EN-DC) mode.

SUMMARY

The described techniques relate to improved methods, systems, devices, or apparatuses that support antenna switch scheduling in a multi-antenna user equipment (UE).

A method of wireless communication in a multi-antenna UE is described. The method may include communicating with a base station using a first antenna, determining to switch from the first antenna to a second antenna for communicating with the base station, determining a silence window in which communication with the base station is suspended, scheduling the switch from the first antenna to the second antenna to occur during the silence window, and switching from the first antenna to the second antenna during the silence window.

A multi-antenna UE is described. The UE may include a first antenna, a second antenna, a processor, memory coupled to the processor, and instructions stored in the memory. The instructions may be executable by the processor to cause the UE to communicate with a base station using the first antenna, determine to switch from the first antenna to the second antenna for communicating with the base station, determine a silence window in which communication with the base station is suspended, schedule the switch from the first antenna to the second antenna to occur during the silence window, and switch from the first antenna to the second antenna during the silence window.

An apparatus for wireless communication is described. The apparatus may include means for communicating with a base station using a first antenna, means for determining to switch from the first antenna to a second antenna for communicating with the base station, means for determining a silence window in which communication with the base station is suspended, means for scheduling the switch from the first antenna to the second antenna to occur during the silence window, and means for switching from the first antenna to the second antenna during the silence window.

A non-transitory computer readable medium storing code for wireless communication is described. The code may include instructions executable by a processor to communicate with a base station using a first antenna, determine to switch from the first antenna to a second antenna for communicating with the base station, determine a silence window in which communication with the base station is suspended, schedule the switch from the first antenna to the second antenna to occur during the silence window, and switch from the first antenna to the second antenna during the silence window.

DETAILED DESCRIPTION

Various aspects of the disclosure provide techniques for scheduling antenna switching in a multi-antenna user equipment (UE). In one aspect, a UE may determine to switch from a first antenna to a second antenna in communicating with a base station. Switching from one antenna to another antenna may involve suspending communication to avoid damaging components (e.g., front end components such as a power amplifier) of the UE and/or to change settings (e.g., antenna switched diversity (ASDIV) configurations) of components. Suspending communication during a connection with a base station may result in communication delays and/or outages. In an aspect, the UE may determine whether an upcoming silence window is available and may schedule the antenna switch to occur during the silence window. In some aspects, scheduling an antenna switch may reduce outages or loss of connection due to transmission and/or reception suspension or blanking.

Aspects of the disclosure are initially described in the context of a wireless communications system. Aspects of the disclosure are further illustrated by and described with reference to apparatus diagrams, timeline diagrams, system diagrams, and flowcharts that relate to antenna switch scheduling in a multi-antenna UE.

Figure 1:
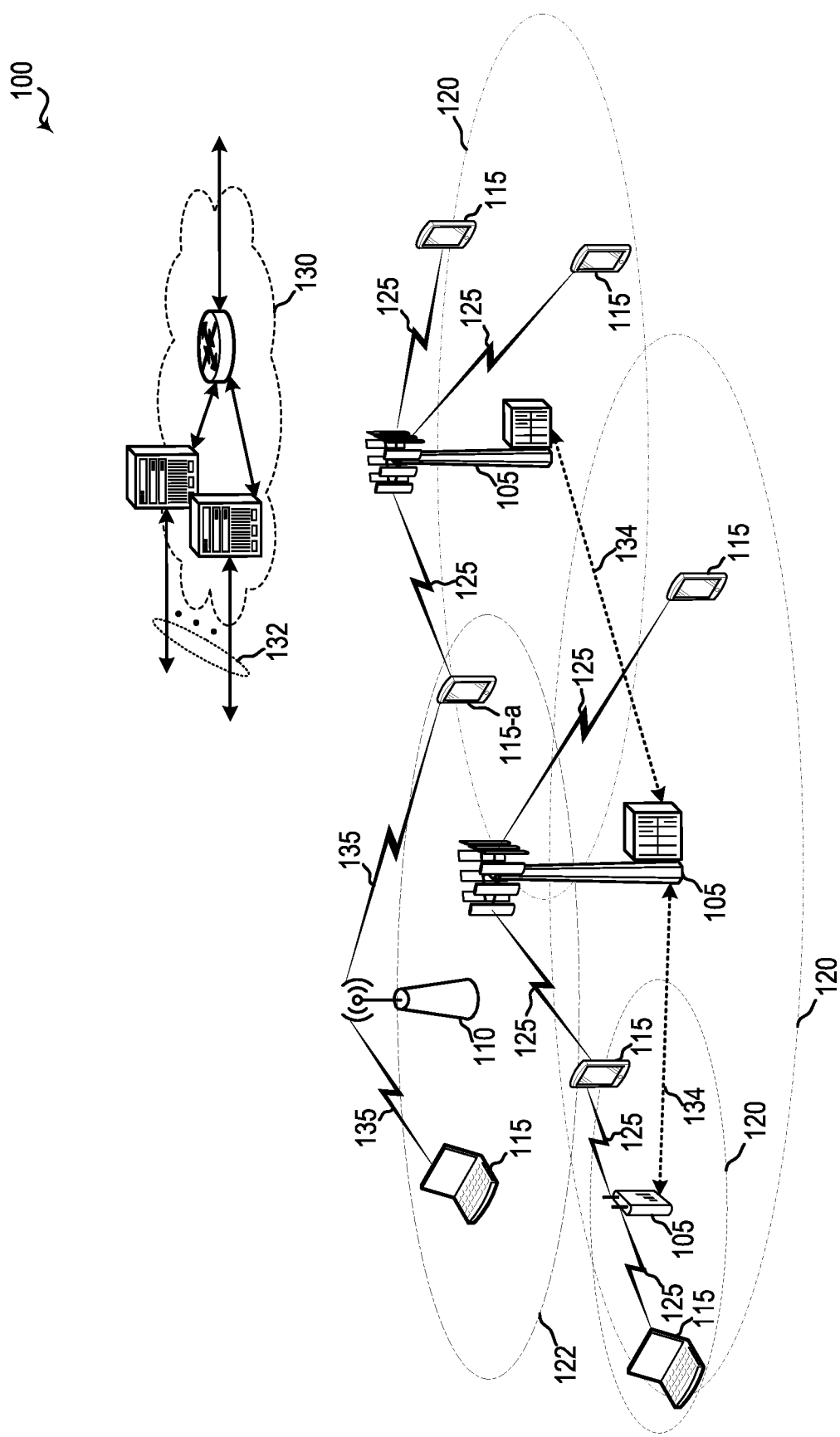
FIG. 1 illustrates an example of a system for wireless communication that supports antenna switch scheduling in a multi-antenna user equipment (UE) in accordance with aspects of the present disclosure.

FIG. 1 illustrates an example of a wireless communications system 100 that supports antenna switch scheduling in a multi-antenna UE in accordance with various aspects of the present disclosure. The wireless communications system 100 includes base stations 105, UEs 115, and a core network 130. In some aspects, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. In some aspects, each base station 105 may provide communication coverage for a macro cell, a small cell, a hot spot, or other types of cells, or various combinations thereof. In some aspects, a base station 105 may be movable and therefore provide communication coverage for a moving geographic coverage area 110. In some aspects, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some aspects, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some aspects, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some aspects, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some aspects half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. In some aspects, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some aspects, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some aspects, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one aspect, a base station 105 may multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds ($Tf=307200*Ts$). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols and in some instances, a symbol of a mini-slot or a mini-slot may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period).

Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some aspects a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some aspects (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some aspects, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some aspects the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some aspects the system bandwidth may refer to a minimum bandwidth unit for scheduling communications between a base station 105 and a UE 115. In other aspects a base station 105 or a UE 115 may also support communications over carriers having a smaller bandwidth than the system bandwidth. In such aspects, the system bandwidth may be referred to as "wideband" bandwidth and the smaller bandwidth may be referred to as a "narrowband" bandwidth. In some aspects of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some aspects, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some aspects, NR shared spectrum may increase spectrum utilization and spectral efficiency, specifically through dynamic vertical (e.g., across frequency) and horizontal (e.g., across time) sharing of resources.

In some cases, UE 115 may be configured with multiple antennas to communicate with base station 105. In one aspect, UE 115 may use a first antenna to communicate with base station 105 while a second antenna of UE 115 is not used. UE 115 may determine to switch to using the second antenna, instead of the first antenna, to communicate with base station 105. UE 115 may opportunistically schedule the switch from the first antenna to the second antenna to coincide with a silence window in which communication with base station 105 will be suspended. In another aspect, UE 115 may communicate with base station 105 using multiple antennas simultaneously (e.g., as in downlink MIMO (DL-MIMO) and/or uplink MIMO (UL-MIMO)) while other antennas of UE 115 are not used. UE 115 may determine to switch to from the used antennas to the unused antennas to communicate with base station 105 and may opportunistically schedule the switches to occur during a silence window. Further description of scheduling antenna switching is described below.

Figure 2:
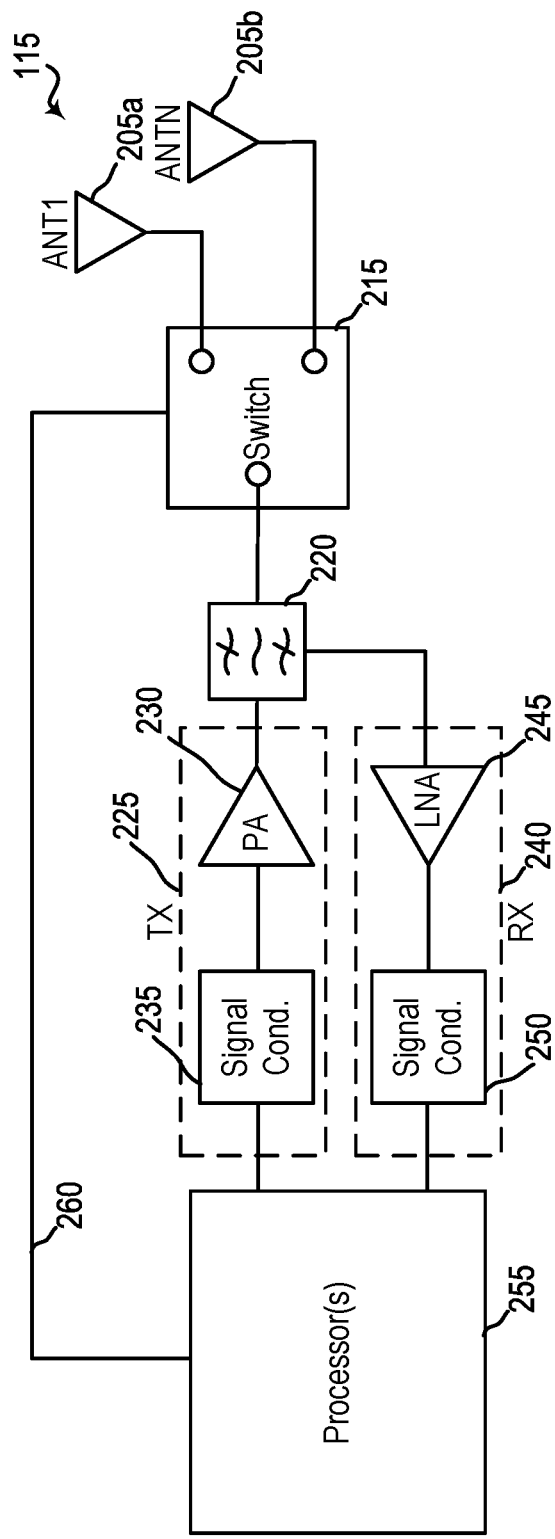
FIG. 2 is a block diagram of portions of a multi-antenna UE that supports antenna switch scheduling in accordance with aspects of the present disclosure.

FIG. 2 illustrates a block diagram of various components of a UE 115 that supports antenna switch scheduling in accordance with various aspects of the present disclosure. FIG. 2 is one example configuration of UE 115, and other multi-antenna configurations of UE 115 are contemplated to be within the scope of the disclosure. In one aspect, UE 115 utilizes ASDIV. UE 115 includes a first antenna (ANT1) 205*a* and a second antenna (ANT2) 205*b* coupled to a switch component 215. In one aspect, first antenna 205*a* and second antenna 205*b* may be in different areas of UE 115 (e.g., one at a bottom area of UE 115 and one at a top area of UE 115). Although two antennas are depicted, skilled artisans will recognize that more than two antennas may be implemented. Switch 215 is operable to couple and decouple first antenna 205*a* and second antenna 205*b* to other components of UE 115. Although switch 215 is represented by a single block in FIG. 2, switch 215 may include multiple switches and/or components.

A filter component 220 is coupled to switch 215 and may be configured to pass signals of selected frequencies. Although filter 220 is represented by a single block in FIG. 2, filter 220 may include multiple filters and/or components. Filter 220 may be coupled to a transmit (TX) chain 225 that includes one or more power amplifiers 230 and other signal conditioning components/circuitry (e.g., mixers, amplifiers, filters) 235. Filter 220 may also be coupled to a receive (RX) chain 240 that includes one or more low noise amplifiers (LNAs) 245 and other signal conditioning components/circuitry (e.g., automatic gain control (AGC), mixers, amplifiers, filters) 250. LNA(s) 245 may include built-in AGC functionality. Transmit chain 225 and receive chain 240 are coupled to one or more processors 255 (e.g, a modem). Processor 255 is coupled to switch 215 (represented by control line 260) and may control switching operations to select an antenna for communication with a base station 105.

In one aspect, UE 115 may be configured to operate in a multi-connectivity mode (e.g., an E-UTRA New Radio-Dual Connectivity (EN-DC) mode) in which one or both antennas 205*a*, 205*b* are configured to transmit and/or receive signals corresponding to multiple radio access technologies (RATs). In the multi-connectivity mode, UE 115 may share switch 215 between RATs, and the RATs may either share other front-end components (e.g., filters, amplifiers, mixers) or have separate front-end components or chains. In another aspect, UE 115 may be configured to operate in carrier aggregation (CA) mode using multiple carriers. In CA mode, UE 115 may share switch 215 among carriers and the carriers may either share other front-end components (e.g., filters, amplifiers, mixers) or have separate front-end components or chains.

Processor 255 may employ any number of different methodologies for determining the antenna(s) to use for transmitting and/or receiving. In one aspect, processor 255 may use communication metrics corresponding to downlink signal conditions, uplink signal conditions, or a combination thereof to determine the antenna(s) to use. In one aspect, processor 225 may use receive signal strength metrics (e.g., receive signal strength indicator (RSSI), reference signal receive power (RSRP), reference signal receive quality (RSRQ), or other signal-to-noise (SNR) metrics). In one aspect, processor 225 may use UL transmission metrics, such as maximum transmit power limit (MTPL), power headroom (which may vary based on modulation and coding schemes (MCS)), and specific absorption rate (SAR) backoff metrics. In one aspect, processor 255 may use communication metrics filtered over time (e.g., an average metric over time). In one aspect, processor 255 may determine to switch from one antenna to another antenna when a difference between RSRP (RSRPDelta) of the antennas is greater than a threshold value (e.g., 3 dB), when the average RSRPDelta is greater than a threshold, and/or when the MTPL has been reached for some percentage of a time period.

ASDIV may involve suspending current transmissions of transmit chain 225 and/or suspending or disabling receive chain 240 components during a switch between antennas (e.g., from first antenna 205*a* to second antenna 205*b*). Transmissions on transmit chain 225 may need to be blanked or suspended to avoid damaging one or more components, such as power amplifier(s) 230. Receive chain 240 components, such as LNA(s) 245 and AGC components, may need to be suspended or disabled to change AGC and digital controlled variable gain amplifier (DVGA) settings or offsets to account for changing ASDIV configuration settings. In one aspect, processor 255 determines whether a silence window will occur in communications with a base station 105 and whether to wait for the silence window to switch antennas.

Figure 3:
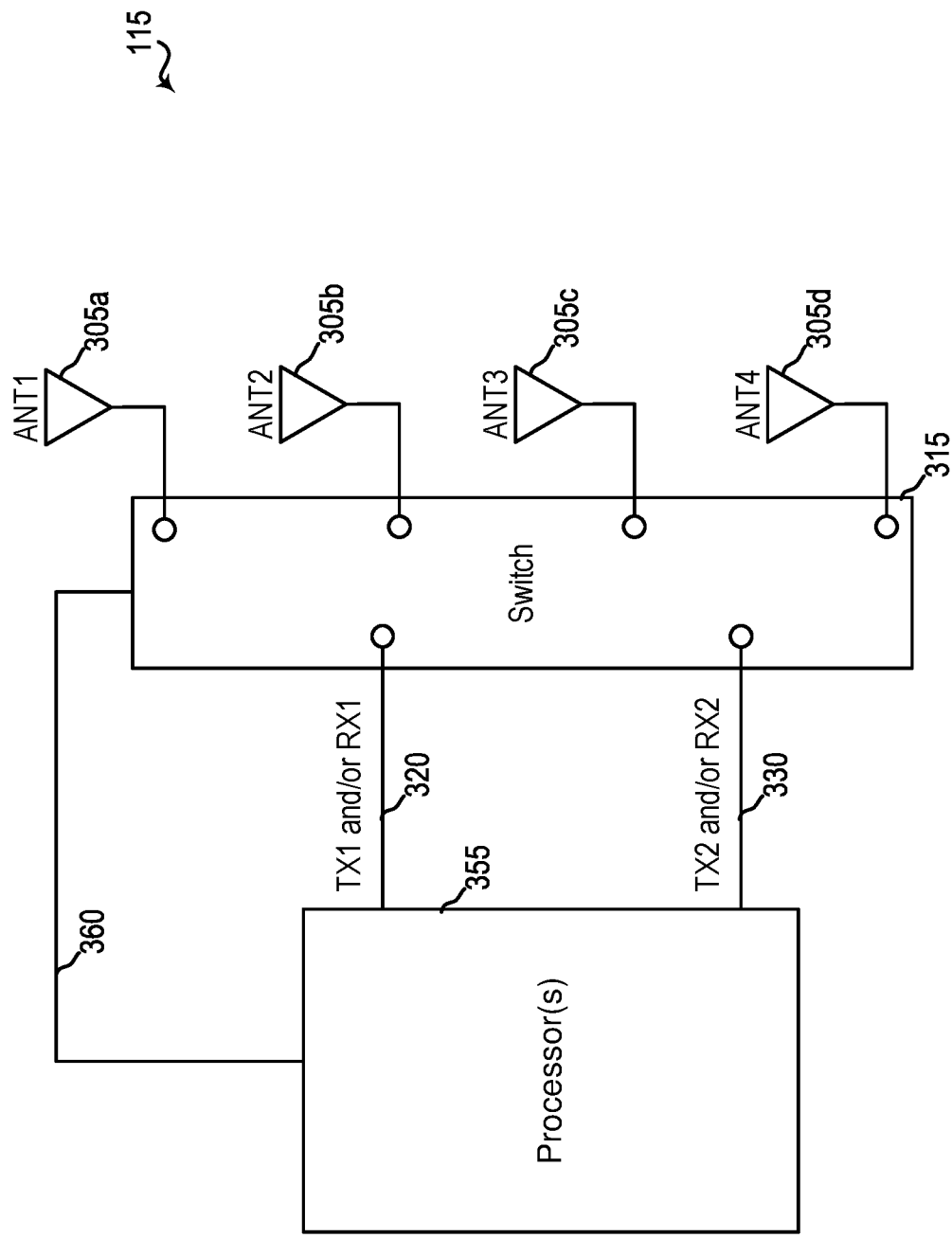
FIG. 3 is a block diagram of portions of a multi-antenna UE that supports multiple-input-multiple-output (MIMO) antenna switch scheduling in accordance with aspects of the present disclosure.

FIG. 3 illustrates a block diagram of various portions of a UE 115 that supports antenna switch scheduling for MIMO (e.g., DL-MIMO, UL-MIMO) applications in accordance with various aspects of the present disclosure. FIG. 3 is one example configuration of UE 115, and other multi-antenna configurations of UE 115 are contemplated to be within the scope of the disclosure. UE 115 includes a first antenna (ANT1) 305*a*, a second antenna (ANT2) 305*b*, a third antenna (ANT3) 305*c*, and a fourth antenna (ANT4) 305*d* coupled to a switch component 315. Although four antennas are depicted, skilled artisans will recognize that more than four antennas may be implemented. In one aspect, the antennas may be in different areas of UE 115. Switch 315 is operable to couple and decouple first antenna 305*a*, second antenna 305*b*, third antenna 305*c* and fourth antenna 305*d* to other components of UE 115. Although switch 315 is represented by a single block in FIG. 3, switch 315 may include multiple switches or components.

In MIMO applications, multiple ones of antennas 305*a*-305*d* may transmit and/or receive simultaneously. For example, in UL-MIMO signals for transmission on a first path (or chain) 320 may be routed to a first one of antennas 305*a*-305*d* and signals for transmission on a second path (or chain) 330 may be routed to a second one of antennas 305*a*-305*d*. In a DL-MIMO example, signals received on a first one of antennas 305*a*-305*d* may be routed to first path 320 and signals received on a second one of antennas 305*a*-305*d* may be routed to second path 330. First and second paths 320 and 330 may include various components that are part of transmission and/or receive chains.

UE 115 may include one or more processors 355 coupled to paths 320, 330 and to switch 315 via a control line 360 to control the routing of paths 320, 330 to the various antennas 305*a*-305*d*. Processor 355 may determine metrics (as described with reference to FIG. 2) associated with each antenna 305*a*-305*d* and select an antenna for each path 320, 330 based on the metrics. Processor 355 may also determine to reroute path 320 and/or 330 to a different antenna based on the metrics. Processor 355 may determine to switch antennas for each path 320, 330 independently. For example, path 320 may be routed to first antenna 305a and path 330 may be routed to second antenna 305b, and processor 355 may determine to reroute path 320 to third antenna 305c while path 330 remains routed to second antenna 305b. In one aspect, processor 355 determines whether a silence window will occur in communications with a base station 105 and whether to wait for the silence window to switch antennas for one or both paths 320, 330.

UE 115 of FIG. 3 may be configured to operate in a multi-connectivity mode (e.g., EN-DC mode) in which one or multiple ones of antennas 205a-205d are configured to transmit and/or receive signals corresponding to multiple RATs. In the multi-connectivity mode, UE 115 may share switch 315 between RATs, and the RATs may either share other front-end components (e.g., filters, amplifiers, mixers) or have separate front-end components or chains. UE 115 of FIG. 3 may be configured to operate in CA mode in which one or multiple ones of antennas 205a-205d are configured to transmit and/or receive signals corresponding to multiple carriers.

Figure 4:
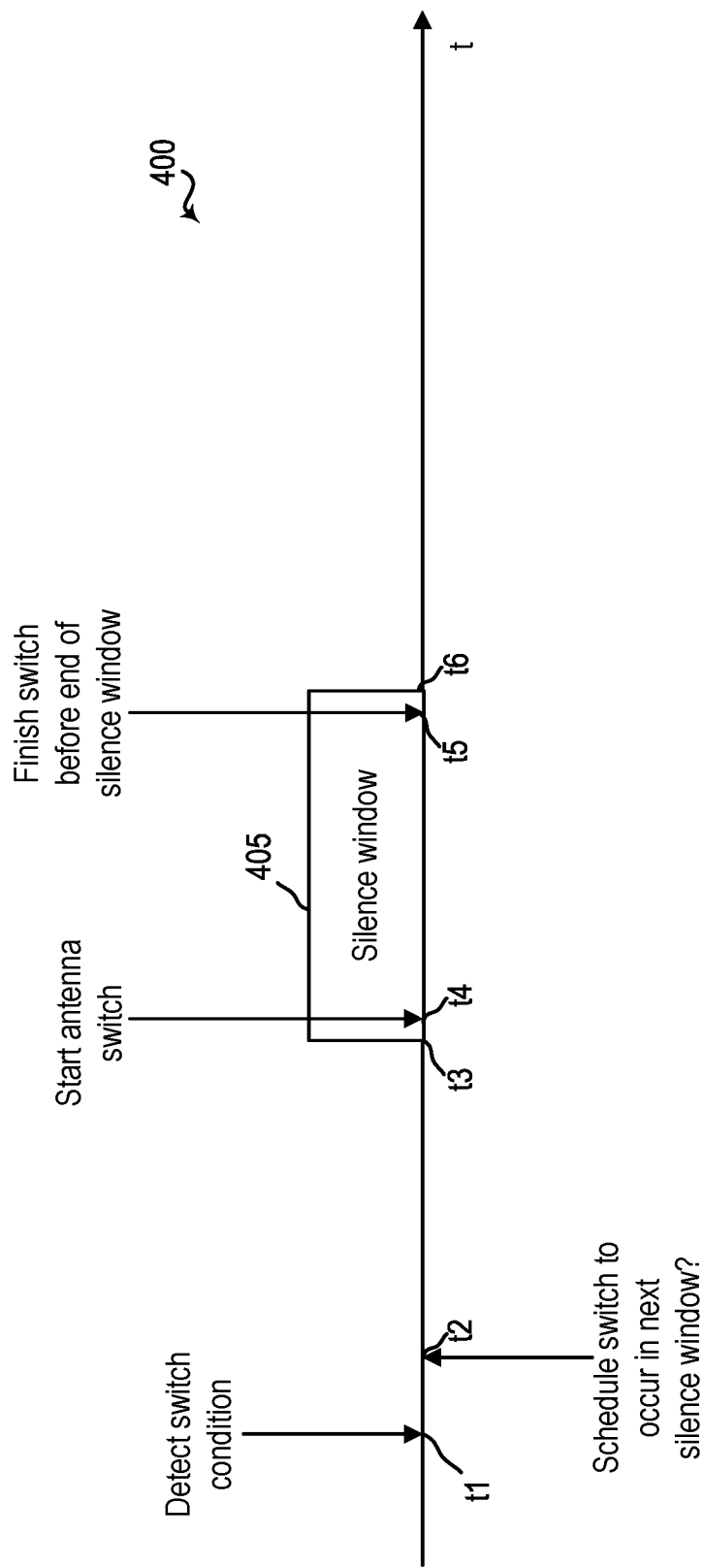
FIGS. 4-8 are timeline diagrams depicting UE operations in antenna switch scheduling in accordance with aspects of the present disclosure.

FIG. 4 is illustrates a timeline diagram 400 of operations of UE 115 that supports antenna switch scheduling in accordance with aspects of the present disclosure. Timeline 400 is one aspect of operations that may be performed by UE 115. Other operations in accordance with the disclosure and other orders of operations may be executed by UE 115. The operations depicted in timeline 400 may be performed and/or executed by a processor (e.g., processor 255, processor 355) and switch (e.g., switch 215, switch 315).

At t1, UE 115 detects a switch condition by determining to switch communication from a first antenna to a second antenna. For example, a first antenna that is being used to communicate with a base station 105 may experience degraded channel conditions (e.g., degraded channel conditions due to blockage by a user's hand or head). A second antenna that is not being used for communication may have better channel conditions than the first antenna (e.g., the second antenna may be in a different location of the UE 115 and may experience no or less blockage than the first antenna). In some aspects, UE 115 may determine communication metrics (e.g., DL and/or UL metrics) associated with its antennas to determine whether to switch from a first antenna to a second antenna to communicate with base station 105. In one aspect, UE 115 may use a combination of DL and UL metrics to detect a switch condition.

Some example communication metrics are described with reference to FIG. 2. In one aspect, UE 115 may determine RSRP metrics for the first and second antennas. The switch condition may correspond to RSRPDelta (or average RSRPDelta) exceeding a threshold. In another aspect, UE 115 may determine whether the MTPL for the first antenna has been reached for a threshold percentage of a time period and use this determination in combination with an RSRP determination to detect a switch condition. In some aspects, UE 115 may periodically evaluate communication metrics to determine whether to switch antennas and ASDIV configurations. As one example, UE 115 may evaluate communication metrics every 640 ms.

At t2, UE 115 determines whether a silence window 405 will occur and whether to schedule the antenna switch to take place during silence window 405. In FIG. 4, t2 is depicted as occurring some time after t1 (the switch detection). However, the operations of t2 may occur directly after detecting a switch condition or simultaneously with detecting a switch condition. Silence window 405 may correspond to various different types of time durations in which communications between UE 115 and base station 105 will be suspended. For example, silence window 405 may correspond to a measurement gap duration, a connected mode discontinuous reception (CDRX) or discontinuous transmission (DTX) off (e.g., sleep) state duration, and/or a silence interval in voice communications. In some aspects, UE 115 may be configured to operate in a multi-connectivity mode or CA mode, and silence window 405 may correspond to a time duration in which communication with base station(s) 105 is suspended for multiple RATs or multiple carriers. A silence window may be determined using various techniques including by analyzing control information or parameters determined by UE 115 or signaled to UE 115 from a network.

In some scenarios, the channel conditions of a first antenna that is being used for communications with base station 105 may be degraded to a point where UE 115 may determine to switch to a second antenna before waiting for silence window 405. For example, the channel conditions related to the first antenna may be such that UE 115 may lose connection with base station 105 before silence window 405 occurs. UE 115 may use the communication metrics (e.g., DL and/or UL metrics) to determine whether to wait for silence window 405 to switch antennas. In one aspect, UE 115 may compare communication metrics to a first threshold at t1 to determine whether to switch antennas and may compare the communication metrics to a second threshold at t2 to determine whether to wait for silence window 405 to switch antennas. In an aspect, the communication metrics may correspond to RSRPDelta and the first threshold may correspond to a first dB level (e.g., 3 dB) and the second threshold may correspond to a second dB level greater than the first dB level (e.g., 2 dB greater than the first dB level, or 5 dB). UE 115 may determine to switch antennas, and wait for silence window 405 to switch, if RSRPDelta exceeds the first threshold but does not exceed the second threshold. If RSRPDelta exceeds the first and second thresholds, UE 115 may switch antennas without waiting for silence window 405 to do so.

UE 115 may also factor in the length of time between detecting a switch condition and the start of silence window (e.g., from t1 to t3) to determine whether to wait for silence window 405 to switch. If the length of time between t1 and t3 exceeds a threshold time, UE 115 may determine to switch before silence window 405. UE 115 may use a combination of communication metrics and time metrics to determine whether to wait for silence window 405 to switch. In an aspect, UE 115 may compare communication metrics to thresholds (e.g., a first threshold and a second threshold) and compare the time until the next silence window 405 to determine whether to wait for silence window 405 to switch.

The switch from a first antenna to a second antenna may not occur instantaneously. Instead, various settings and/or offsets may need to change and signals to components may need to be suspended in preparation to switch, which may take some time. The length of time from initiating the switch (e.g., suspending signals, initiating the change of settings) to completing the switch of antennas may be referred to as a switch duration. UE 115 may compare the switch duration to a silence duration, which corresponds to a length of time of silence window 405 (e.g., the length of time between t3 and t6), to determine whether silence duration of silence window 405 is long enough to accommodate the switch (e.g., whether the silence duration is equal to or greater than the switch duration). If the silence duration is greater than or equal to the switch duration, UE 115 may schedule the switch to occur during the silence duration.

As depicted in FIG. 4, UE 115 determines to schedule the antenna switch to occur during silence window 405, which starts at t3 and ends at t6. UE 115 begins to switch from a first antenna to a second antenna at t4 and ends the switch at t5. Although t4 is depicted in FIG. 4 as occurring after t3, t4 may coincide with t3. That is, UE 115 may begin the antenna switch at the start of silence window 405.

Figure 5:
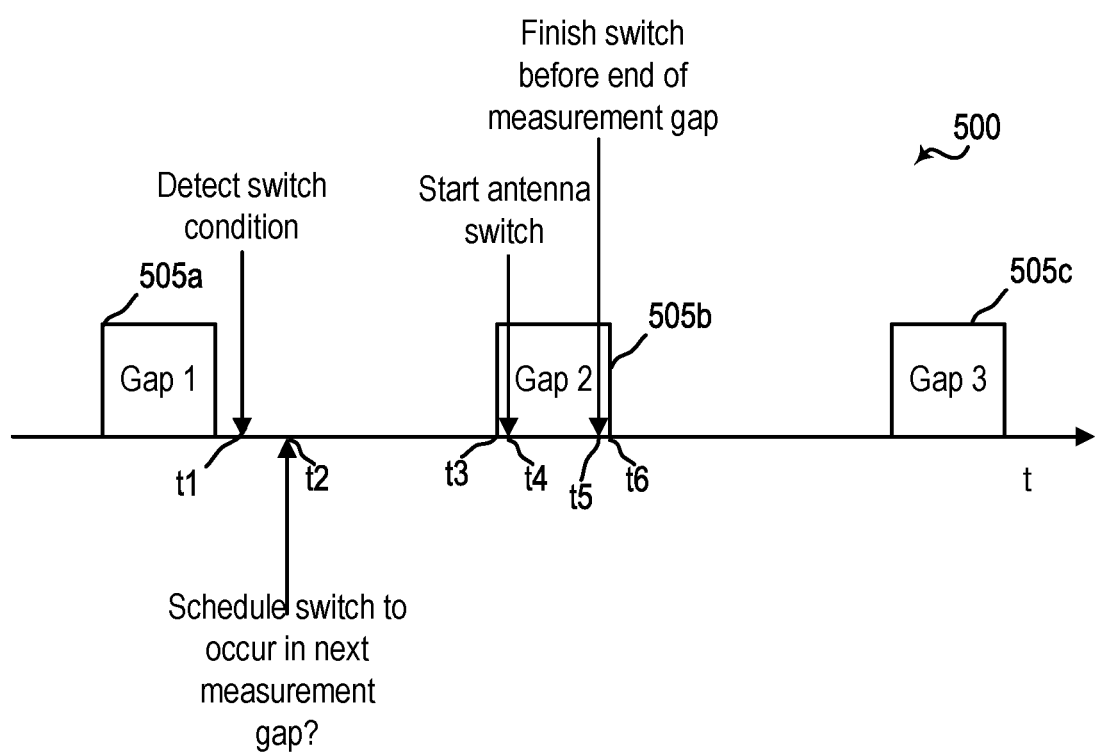

FIG. 5 is illustrates a timeline diagram 500 of operations of UE 115 that supports antenna switch scheduling in accordance with aspects of the present disclosure. Timeline 500 is one aspect of operations that may be performed by UE 115. Other operations in accordance with the disclosure and other orders of operations may be executed by UE 115. The operations depicted in timeline 500 may be performed and/or executed by a processor (e.g., processor 255, processor 355) and switch (e.g., switch 215, switch 315).

In FIG. 5, silence windows (e.g., as described with reference to FIG. 4) correspond to measurement gaps such as gaps 505a, 505b and 505c. In some aspects, gaps 505a-505c may correspond to per-UE measurement gaps. Gaps 505a-505c may occur periodically such as every 40 ms, 80 ms, 160 ms or other periodicities. In multi-connectivity scenarios, such as EN-DC, or CA scenarios measurement gaps may correspond to common measurement gaps (e.g., shared measurement gaps) for the multiple RATs or the multiple carriers. At t1, UE 115 detects a switch condition by determining to switch communication from a first antenna to a second antenna. As depicted in FIG. 5, t1 occurs after first gap 505a.

At t2, UE 115 determines whether second gap 505b will occur and whether to schedule the antenna switch to take place during second gap 505b. UE 115 may analyze various factors (e.g., described with reference to FIG. 4), such as communication metrics, a silence duration (e.g., the duration of gap 505b), a switch duration, and a length of time between the switch detection and the start of second gap 505b to determine whether to schedule the antenna switch during second gap 505b.

As depicted in FIG. 5, UE 115 determines to schedule the antenna switch to occur during second gap 505b, which starts at t3 and ends at t6. UE 115 begins to switch from a first antenna to a second antenna at t4 and ends the switch at t5. Although t4 is depicted in FIG. 5 as occurring after t3, t4 may coincide with t3. That is, UE 115 may begin the antenna switch at the start of second gap 505b. The antenna switch during second gap 505b may include changing ASDIV configurations. In an aspect, prior to second gap 505b the ASDIV configuration may be a first configuration (e.g., ASDIV config-0) and after second gap 505b the ASDIV configuration may be a second configuration (e.g., ASDIV config-1). The ASDIV configuration change may be scheduled to occur during second gap 505b and may preempt other changes or measurements during second gap 505b.

Figure 6:
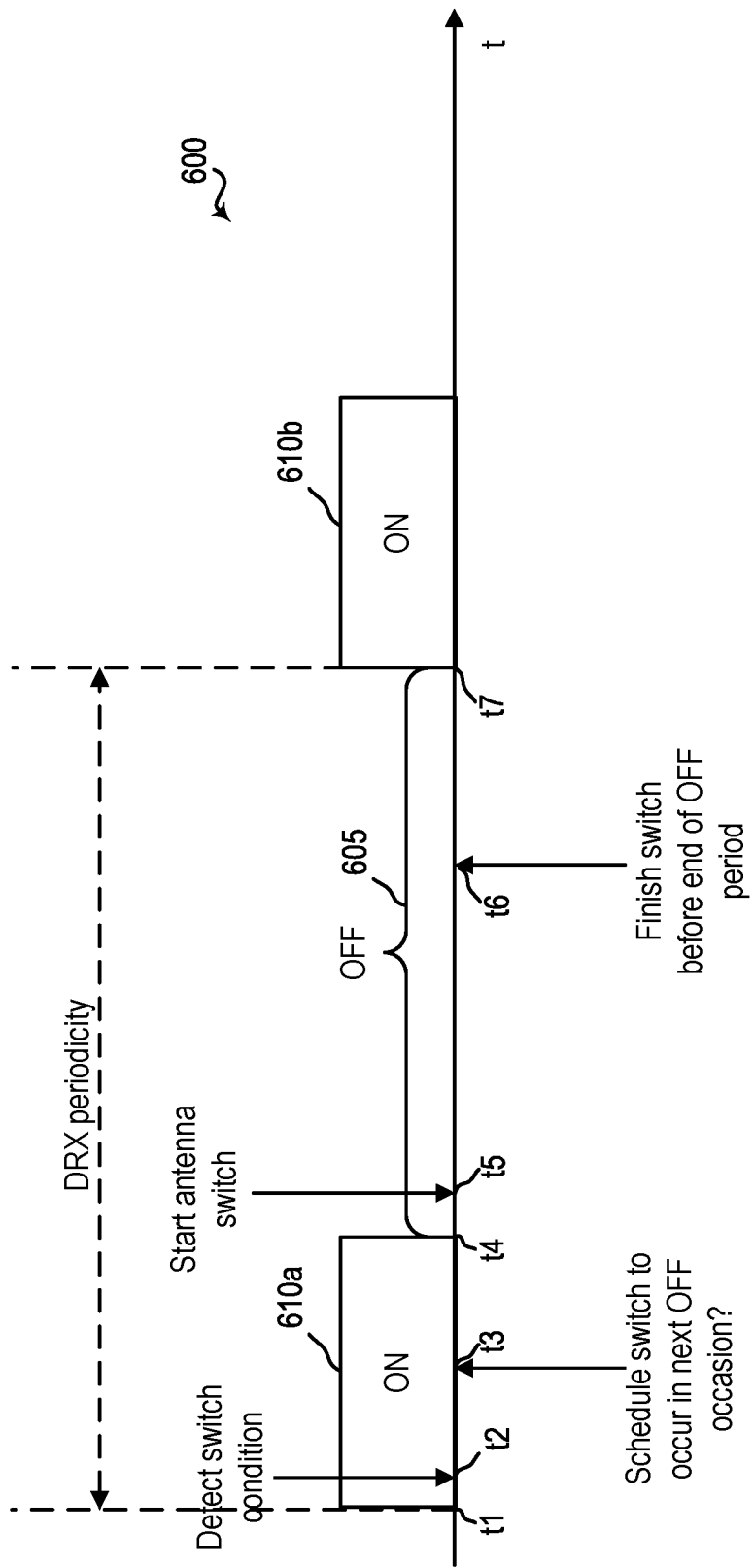

FIG. 6 is illustrates a timeline diagram 600 of operations of UE 115 that supports antenna switch scheduling in accordance with aspects of the present disclosure. Timeline 600 is one aspect of operations that may be performed by UE 115. Other operations in accordance with the disclosure and other orders of operations may be executed by UE 115. The operations depicted in timeline 600 may be performed and/or executed by a processor (e.g., processor 255, processor 355) and switch (e.g., switch 215, switch 315).

In FIG. 6, a silence window (e.g., as described with reference to FIG. 4) corresponds to a DRX and/or DTX (e.g., CDRX) OFF or sleep duration 605 in a DRX cycle. DRX OFF duration 605 may occur periodically according to the DRX cycle and may follow a DRX ON or awake duration 610a. As shown in FIG. 6, the DRX cycle spans from t1 to t7 with ON duration 610a spanning from t1 to t4 and OFF duration 605 spanning from t4 to t7. At t2, UE 115 detects a switch condition by determining to switch communication from a first antenna to a second antenna. As depicted in FIG. 6, t2 occurs during ON duration 610a.

At t3, UE 115 determines whether to schedule the antenna switch to take place during OFF duration 605. UE 115 may analyze various factors (e.g., described with reference to FIG. 4), such as communication metrics, a silence duration (e.g., the length of OFF duration 605), a switch duration, and a length of time between the switch detection and the start of OFF duration 605 to determine whether to schedule the antenna switch during OFF duration 605. In one aspect, UE 115 may schedule the antenna switch to occur during OFF duration 605 if the time between detecting the switch condition and the start of OFF duration 605 is 100 ms or less.

As depicted in FIG. 6, UE 115 determines to schedule the antenna switch to occur during OFF duration 605. UE 115 begins to switch from a first antenna to a second antenna at t5 and ends the switch at t6. Although t5 is depicted in FIG. 6 as occurring after t4 (the start of OFF duration 605), t5 may coincide with t4. That is, UE 115 may begin the antenna switch at the start of OFF duration 605. Once UE 115 finishes the antenna switch at t6, UE 115 may sleep for the remainder of OFF duration 605. The antenna switch during OFF duration 605 may include changing ASDIV configurations. In an aspect, during ON duration 610a the ASDIV configuration may be a first configuration (e.g., ASDIV config-0) and during an ON duration 610b the ASDIV configuration may be a second configuration (e.g., ASDIV config-1).

Figure 7:
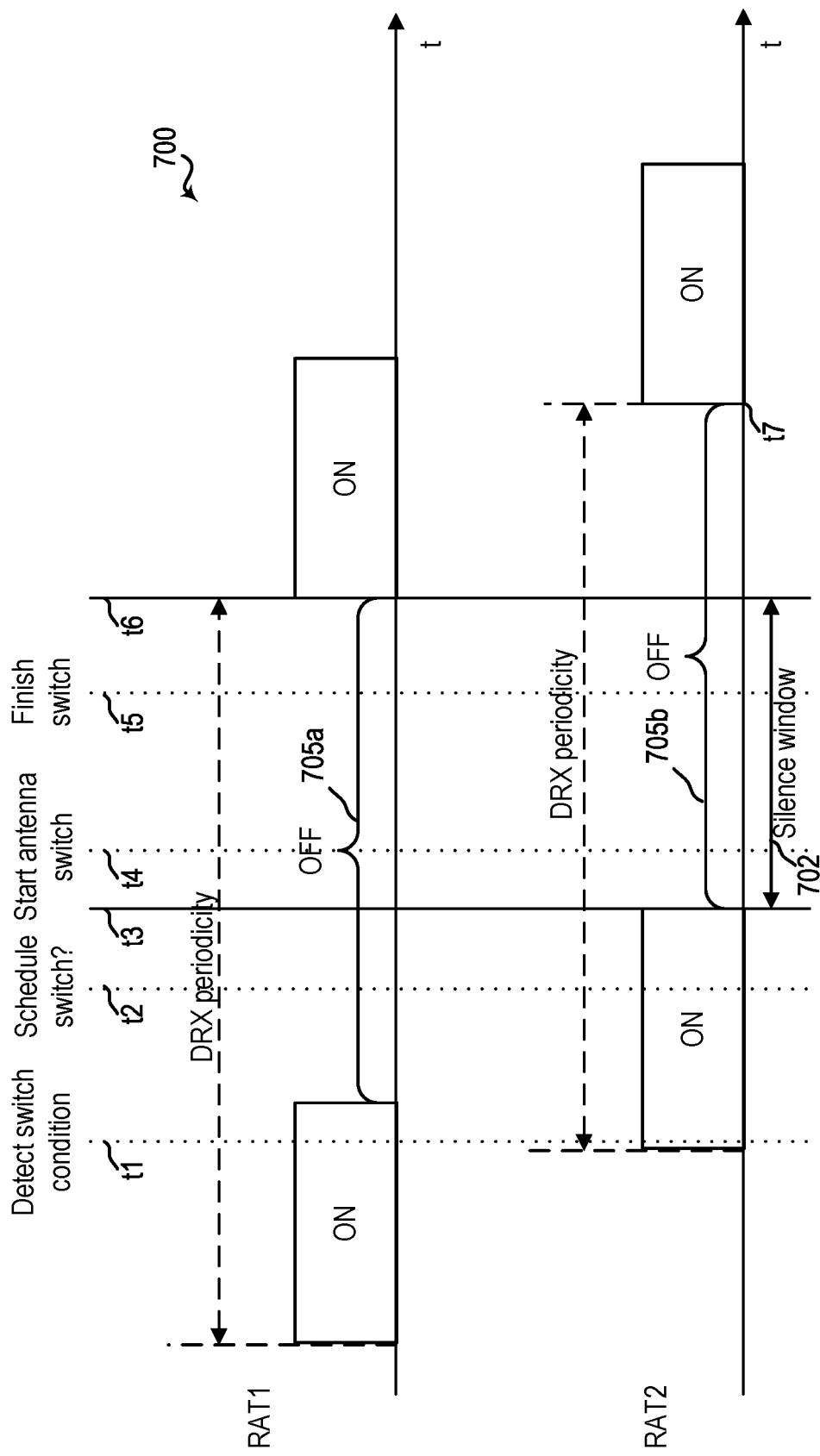

FIG. 7 is illustrates a timeline diagram 700 of operations of UE 115 that supports antenna switch scheduling in a multi-connectivity mode in accordance with aspects of the present disclosure. Timeline 700 is one aspect of operations that may be performed by UE 115. Other operations in accordance with the disclosure and other orders of operations may be executed by UE 115. The operations depicted in timeline 700 may be performed and/or executed by a processor (e.g., processor 255, processor 355) and switch (e.g., switch 215, switch 315).

In FIG. 7, a silence window 702 corresponds to overlapping portions of a DRX OFF duration 705a of a first RAT (RAT1) and a DRX OFF duration 705b of a second RAT (RAT2). In a multi-connectivity mode, such as an EN-DC mode, DRX cycles of the different RATs may not be synchronized in time and may have ON and/or OFF durations of different lengths. UE 115 may determine DRX cycle information for each RAT and identify portions of DRX OFF durations that overlap in time based on the information.

At t1, UE 115 detects a switch condition by determining to switch communication from a first antenna to a second antenna. At t2, UE 115 determines whether to schedule the antenna switch to take place during silence window 702, which corresponds to the overlapping portions of OFF durations 705a and 705b. UE 115 may analyze various factors (e.g., described with reference to FIG. 4), such as communication metrics, a silence duration (e.g., the duration of silence window 702), a switch duration, and a length of time between the switch detection and the start of silence window 702 to determine whether to schedule the antenna switch during silence window 702. In one aspect, UE 115 may schedule the antenna switch to occur during silence window 702 if the time between detecting the switch condition and the start of silence window 702 is 100 ms or less.

As depicted in FIG. 7, UE 115 determines to schedule the antenna switch to occur during silence window 702. UE 115 begins to switch from a first antenna to a second antenna at t4 and ends the switch at t5. Although t4 is depicted in FIG. 7 as occurring after t3 (the start of silence window 702), t4 may coincide with t3. That is, UE 115 may begin the antenna switch at the start of silence window 702. Once UE 115 finishes the antenna switch at t5, UE 115 may sleep for the remainder of silence window 702 (e.g., until t6).

Figure 8:
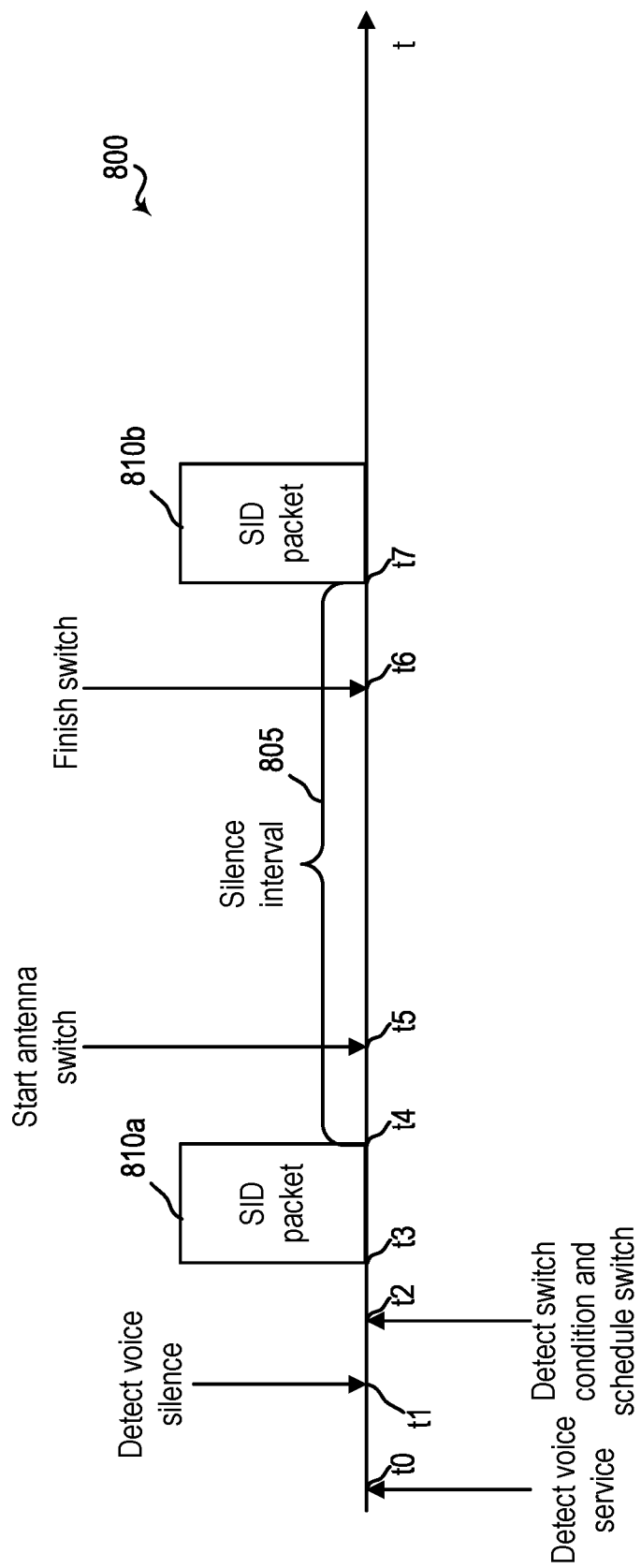

FIG. 8 is illustrates a timeline diagram 800 of operations of UE 115 that supports antenna switch scheduling in accordance with aspects of the present disclosure. Timeline 800 is one aspect of operations that may be performed by UE 115. Other operations in accordance with the disclosure and other orders of operations may be executed by UE 115. The operations depicted in timeline 800 may be performed and/or executed by a processor (e.g., processor 255, processor 355) and switch (e.g., switch 215, switch 315).

In FIG. 8, a silence window corresponds to a silence interval 805 that may occur in a voice type or voice related service. During voice related services, a voice activity factor may correspond to an average time that voice is communicated between users. In one aspect, the voice activity factor may be around 40%. During inactivity a voice vocoder may send a silence indicator descriptor (SID) vocoder packet 810a at the beginning of a silence occasion and may send other SID packets (e.g., packet 810b) at selected intervals (e.g., every 160 ms). Silence interval 805 may correspond to the time between SID packets 810a and 810b.

At t0, UE 115 may determine that an active service is a voice related service. At t1, UE 115 may determine (e.g., through a voice activity detection algorithm) that a condition is met to enter a voice silence period or occasion and may start to send SID packet 810a at t3. Although t3 is depicted in FIG. 8 as occurring after t1, t3 may coincide with t1. That is, SID packet 810a may be sent immediately when the voice activity detection algorithm detects silence.

At t2, UE 115 detects a switch condition by determining to switch communication from a first antenna to a second antenna. At t2, UE 115 determines whether to schedule the antenna switch to take place during silence interval 805. UE 115 may analyze various factors (e.g., described with reference to FIG. 4), such as communication metrics, a silence duration (e.g., the duration of silence interval 805), a switch duration, and a length of time between the switch detection and the start of silence interval 805 to determine whether to schedule the antenna switch during silence interval 805. Although t2 is depicted as occurring after t1, UE 115 may detect a switch condition at the same time as detecting voice silence or before detecting voice silence. In one aspect, UE 115 may detect a switch condition before detecting voice silence and may wait for a selected time period to detect voice silence. If voice silence is not detected within the selected time period, UE 115 may begin the antenna switch. If voice silence is detected within the selected time period, UE 115 may determine to schedule the antenna switch to occur during silence interval 805.

As depicted in FIG. 8, UE 115 determines to schedule the antenna switch to occur during silence interval 805. UE 115 begins to switch from a first antenna to a second antenna at t5 and ends the switch at t6 before the communication of the next SID packet 810b at t7. Although t5 is depicted in FIG. 8 as occurring after t4 (the end of SID packet 810a), t5 may coincide with t4. That is, UE 115 may begin the antenna switch immediately after communication of SID packet 810a.

Figure 9:
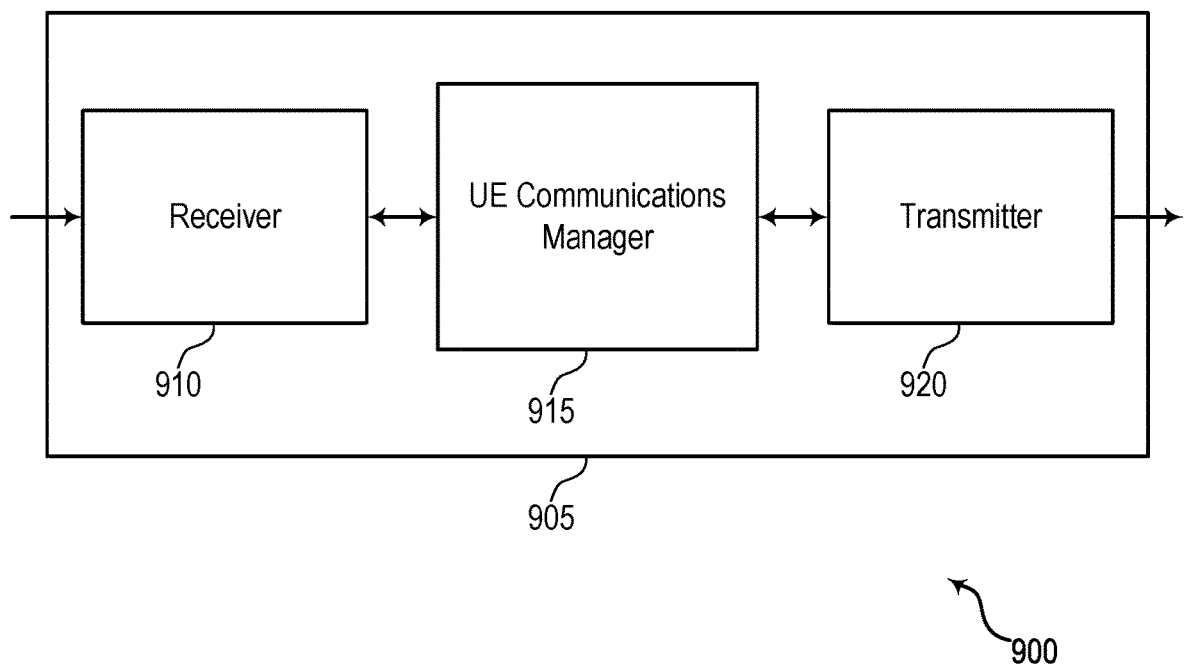
FIG. 9 illustrates a block diagram of a device that supports antenna switch scheduling in accordance with aspects of the present disclosure.

FIG. 9 shows a block diagram 900 of a wireless device 905 that supports antenna switch scheduling in a multi-antenna UE in accordance with aspects of the present disclosure. Wireless device 905 may be an example of aspects of a user equipment (UE) 115 as described herein. Wireless device 905 may include receiver 910, UE communications manager 915, and transmitter 920. Wireless device 905 may also include a processor. Each of these components may be in communication with or coupled to one another (e.g., via one or more buses).

Receiver 910 may receive information such as packets, user data, or control information associated with various information channels (e.g., control channels, data channels, etc.). Information may be passed on to other components of the device. The receiver 910 may utilize a single antenna or a set of antennas. Receiver 910 may be an example of aspects of components described with reference to FIGS. 2 and 3 and the transceiver 1035 described with reference to FIG. 10.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. UE communications manager 915 and/or at least some of its various sub-components may be physically located at various positions, including being distributed such that portions of functions are implemented at different physical locations by one or more physical devices. In some aspects, UE communications manager 915 and/or at least some of its various sub-components may be a separate and distinct component in accordance with various aspects of the present disclosure. In other aspects, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE communications manager 915 may be an example of aspects of the UE communications manager 1015 described with reference to FIG. 10, processor 255 described with reference to FIG. 2, and/or processor 355 described with reference to FIG. 3.

UE communications manager 915 may determine whether to switch from a first antenna to a second antenna to communicate (e.g., transmit and/or receive) with a base station, determine whether a silence window will occur, determine whether to wait for the silence window to perform the antenna switch, and perform the antenna switch as described herein.

Transmitter 920 may transmit signals generated by other components of the device. In some aspects, transmitter 920 may be collocated with receiver 910 in a transceiver module. Transmitter 920 may be an example of aspects of the components described with reference to FIGS. 2 and 3 and the transceiver 1035 described with reference to FIG. 10. Transmitter 920 may utilize a single antenna or a set of antennas.

Figure 10:
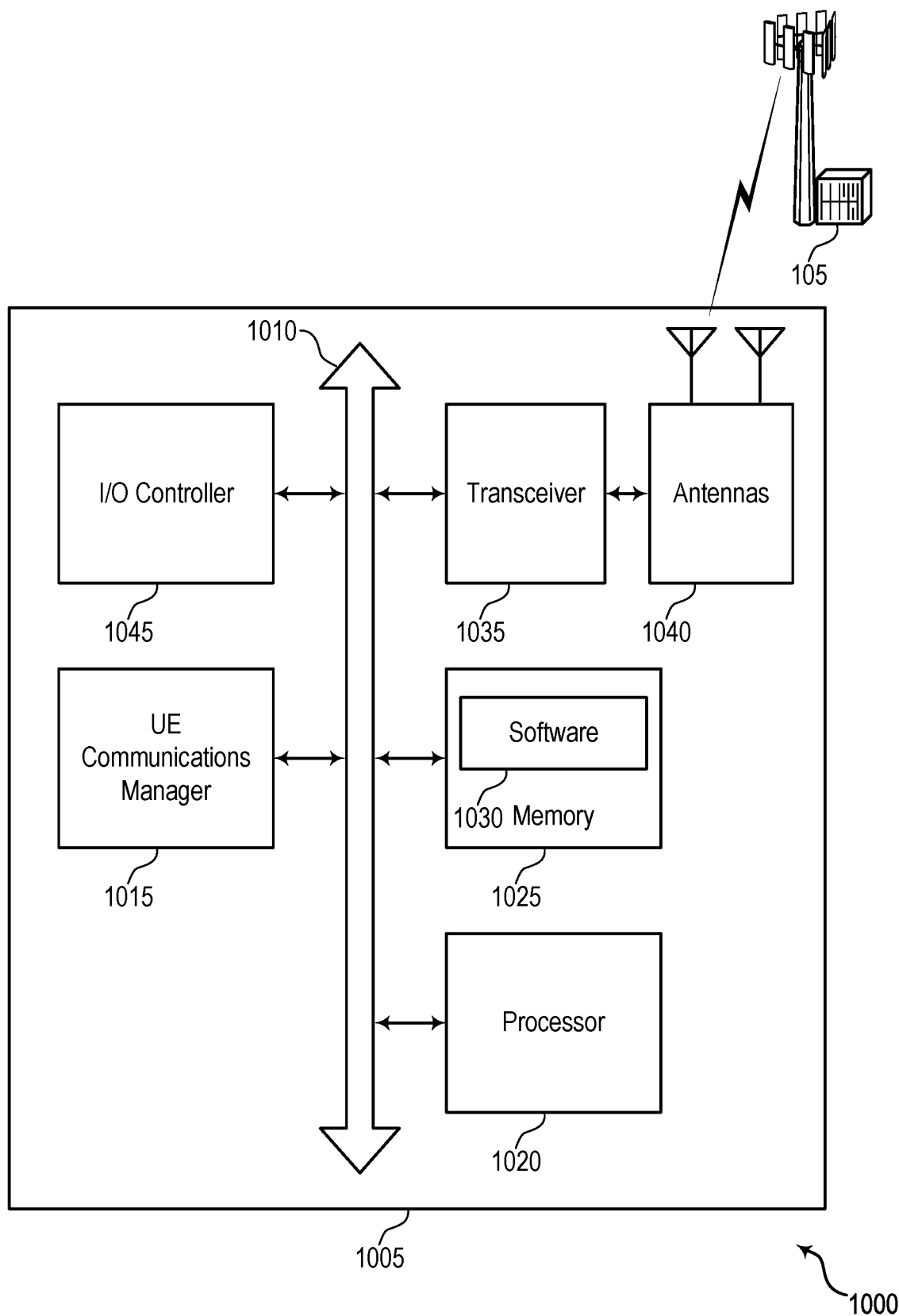
FIG. 10 illustrates a block diagram of a system including a multi-antenna UE that supports antenna switch scheduling in accordance with aspects of the present disclosure.

FIG. 10 shows a diagram of a system 1000 including a device 1005 that supports antenna switch scheduling in a multi-antenna UE in accordance with aspects of the present disclosure. Device 1005 may be an example of or include the components of wireless device 905, or a UE 115 as described herein. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication or coupled to each other via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting antenna switch scheduling in a multi-antenna UE).

Memory 1025 may include random access memory (RAM) and read only memory (ROM). Memory 1025 may store computer-readable, computer-executable software 1030 including instructions that, when executed, cause the processor to perform various functions described herein. In some cases, memory 1025 may contain, among other things, a basic input/output system (BIOS) which may control basic hardware or software operation such as the interaction with peripheral components or devices.

Software 1030 may include code to implement aspects of the present disclosure, including code to support antenna switch scheduling in a multi-antenna UE. Software 1030 may be stored in a non-transitory computer-readable medium such as system memory or other memory. In some cases, software 1030 may not be directly executable by the processor but may cause a computer (e.g., when compiled and executed) to perform functions described herein.

Transceiver 1035 may communicate bi-directionally, via one or more antennas, wired, or wireless links as described above. In an aspect, transceiver 1035 may represent a wireless transceiver and may communicate bi-directionally with another wireless transceiver. Transceiver 1035 may also include a modem to modulate the packets and provide the modulated packets to the antennas for transmission, and to demodulate packets from signals received from the antennas.

Device may have more than one antenna 1040, which may be capable of concurrently transmitting or receiving multiple wireless transmissions. FIGS. 2 and 3 include examples of some of the components or parts that may be included in transceiver 1035.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
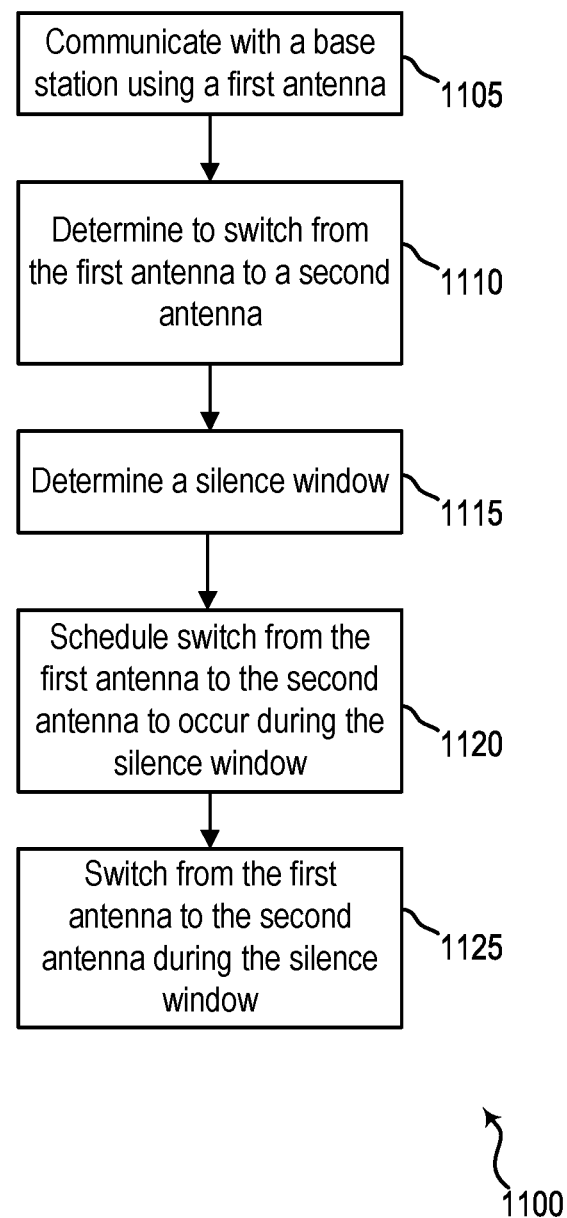
FIGS. 11 and 12 illustrate methods for antenna switch scheduling in a multi-antenna UE in accordance with aspects of the present disclosure.

FIG. 11 shows a flowchart illustrating a method 1100 for antenna switch scheduling in a multi-antenna UE in accordance with aspects of the present disclosure. The operations of method 1100 may be implemented by a UE 115 or its components as described herein. In an aspect, the operations of method 1100 may be performed by a UE communications manager as described with reference to FIGS. 9 and 10 and/or a processor described with reference to FIGS. 2 and 3. In some aspects, a UE 115 may execute a set of codes to control the functional elements of the device to perform the functions described below. Additionally or alternatively, the UE 115 may perform aspects of the functions described below using special-purpose hardware.

At block 1105, UE 115 may communicate (e.g., transmit and/or receive signals) with a base station 105 using a first antenna. The operations of block 1105 may be performed according to the methods described herein. In certain examples, aspects of the operations of block 1105 may be performed by a transceiver, receiver, transmitter, processor, and/or UE communications manager as described herein.

At block 1110, UE 115 may determine to switch from the first antenna to a second antenna for communicating with the base station 105. The operations of block 1110 may be performed according to the methods described herein. In certain examples, aspects of the operations of block 1110 may be performed by a UE communications manager and/or a processor as described herein.

At block 1115, UE 115 may determine whether a silence window will occur in which communication with base station 105 is suspended. The operations of block 1115 may be performed according to the methods described herein. In certain examples, aspects of the operations of block 1115 may be performed by a UE communications manager and/or a processor as described herein.

At block 1120, UE 115 may schedule the switch from the first antenna to the second antenna to occur during the silence window. The operations of block 1120 may be performed according to the methods described herein. In certain examples, aspects of the operations of block 1115 may be performed by a UE communications manager and/or a processor as described herein. In one aspect, the operations of block 1120 may be performed according to the method 1200 described with reference to FIG. 12.

At block 1125, UE 115 may switch from the first antenna to the second antenna during the silence window. The operations of block 1115 may be performed according to the methods described herein. In certain examples, aspects of the operations of block 1115 may be performed by a UE communications manager, a processor, a transceiver, a receiver, and/or a transmitter as described herein.

Figure 12:
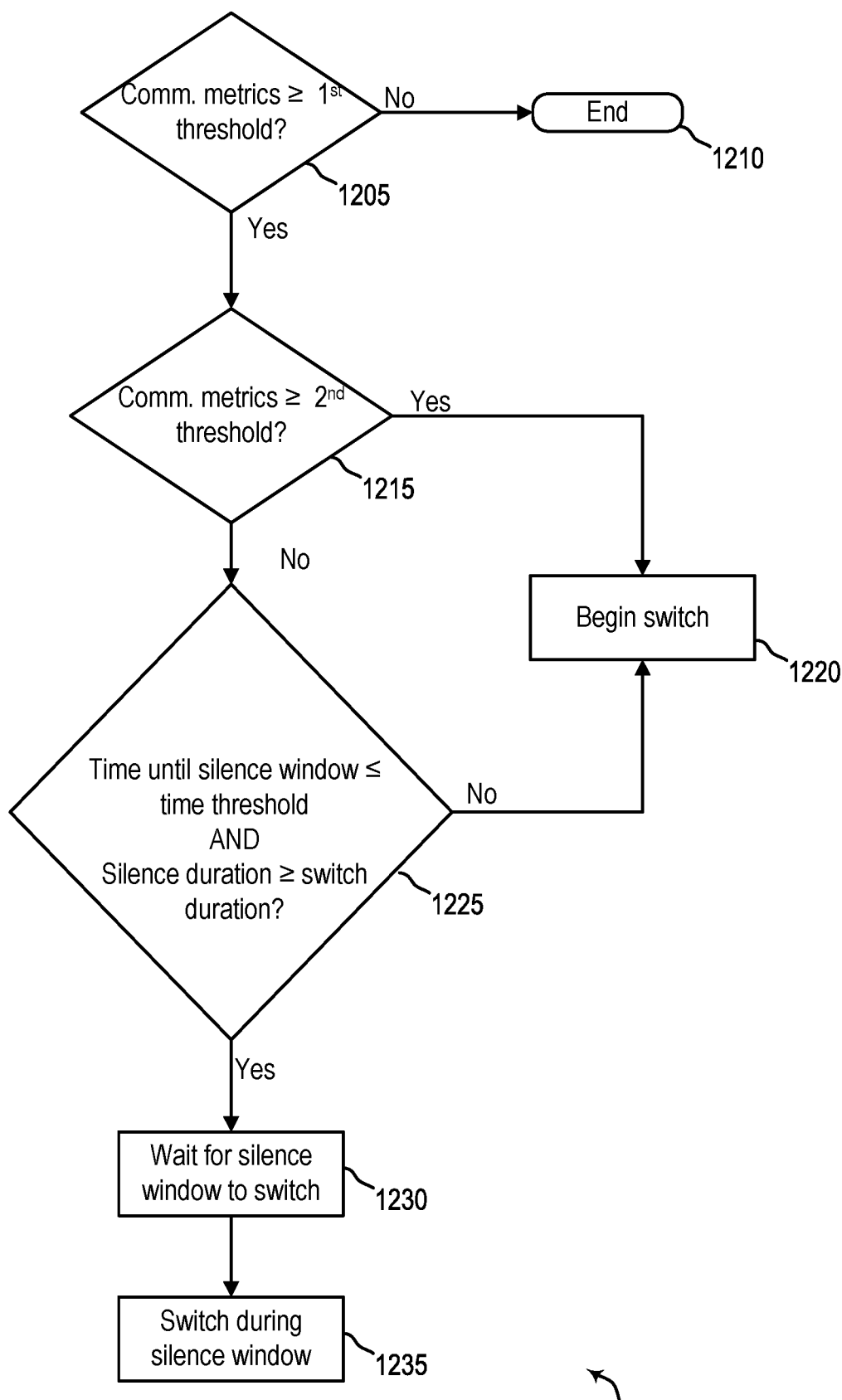

FIG. 12 shows a flowchart illustrating a method 1200 for scheduling an antenna switch in a multi-antenna UE in accordance with aspects of the present disclosure. The operations of method 1200 may be implemented by a UE 115 or its components as described herein. In an aspect, the operations of method 1200 may be performed by a UE communications manager or a processor of a UE 115 as described herein. In some aspects, UE 115 may execute a set of codes to control the functional elements of the device to perform the functions described below. Additionally or alternatively, UE 115 may perform aspects of the functions described below using special-purpose hardware.

At block 1205, UE 115 determines whether communication metrics associated with its multiple antennas exceed a first threshold that would trigger ASDIV switching. The operations of block 1205 may be performed according to the methods described herein. Aspects of communication metrics (e.g., RSRPDelta, MPTL) and thresholds (e.g., 3 dB) are described above. In certain examples, aspects of the operations of block 1205 may be performed by a UE communications manager and/or a processor as described herein.

If the communication metrics do not exceed the first threshold at block 1205, UE 115 ends method 1200 at block 1210. UE 115 may repeat method on a periodic basis, such as every 640 ms. If the communication metrics meet or exceed the first threshold at block 1205, UE 115 compares the communication metrics to a second threshold that is greater than the first threshold at block 1215. In certain examples, aspects of the operations of block 1215 may be performed by a UE communications manager and/or a processor as described herein.

If the communication metrics meet or exceed the second threshold at block 1215, UE 115 begins the antenna switch, at block 1220, without waiting for a silence window. Meeting or exceeding the second threshold may indicate that UE 115 may lose connection with base station 105 if UE 115 waits for a silence window to execute the antenna switch. In certain examples, aspects of the operations of block 1220 may be performed by a UE communications manager, a processor, a transceiver, a receiver, and/or a transmitter as described herein.

If the communication metrics do not meet or exceed the second threshold at block 1215, UE 115 compares the amount of time until a silence window occurs to a time threshold and compares the duration or length of time of the silence window (e.g., a silence duration) to the duration or length of time of the antenna switch (e.g., a switch duration) at block 1225. The operations of block 1225 may be performed according to the methods described herein. In certain examples, aspects of the operations of block 1225 may be performed by a UE communications manager and/or a processor as described herein.

If the amount of time until the silence window meets or exceeds the time threshold or the duration of the silence window is less than the duration of the antenna switch at block 1225, UE 115 begins the antenna switch, at block 1220, without waiting for the silence window. If the amount of time until the silence window is less than the time threshold and the duration of the silence window is greater than or equal to the duration of the antenna switch, UE 115 waits for the silence window to switch antennas at block 1230. The operations of block 1230 may be performed according to the methods described herein. In certain examples, aspects of the operations of block 1230 may be performed by a UE communications manager and/or a processor as described herein.

At block 1235, UE 115 switches from the first antenna to the second antenna during the silence window. In certain examples, aspects of the operations of block 1235 may be performed by a UE communications manager, a processor, a transceiver, a receiver, and/or a transmitter as described herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various aspects. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described aspects.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the aspects and designs described herein, but is to be accorded the broadest scope consistent with the principles and novel features disclosed herein.

What is claimed is:

1. A method for wireless communication in a multi-antenna user equipment (UE), comprising:
communicating with a base station using a first antenna;
assessing communication metrics;
determining to switch from the first antenna to a second antenna for communicating with the base station, wherein the determining to switch from the first antenna to the second antenna comprises comparing the communication metrics to a first threshold to determine whether to switch from the first antenna to the second antenna;
determining a silence window in which communication with the base station is suspended;
comparing the communication metrics to a second threshold to determine whether to wait for the silence window to perform the switch or to perform the switch before the silence window;
determining a length of time between the determining to switch from the first antenna to the second antenna and a start of the silence window;
comparing the length of time to a threshold time;
scheduling the switch from the first antenna to the second antenna to occur during the silence window based at least in part on the comparing of the communication metrics to the second threshold and based at least in part on the length of time being less than the threshold time; and switching from the first antenna to the second antenna during the silence window.

2. The method of claim 1, wherein the communication metrics include a combination of downlink communication metrics and uplink communication metrics.

3. The method of claim 2, wherein the downlink communication metrics are associated with the first antenna and the second antenna and the uplink communication metrics are associated with the first antenna.

4. The method of claim 2, wherein the downlink communication metrics and the uplink communication metrics correspond to communication metrics filtered over time.

5. The method of claim 2, wherein the downlink communication metrics correspond to received signal measurements and the uplink communication metrics correspond to transmission power metrics.

6. The method of claim 1, wherein each of the first threshold and the second threshold include one or more downlink thresholds and one or more uplink thresholds.

7. The method of claim 1, further comprising determining whether the first antenna, the second antenna, or both are shared among a first radio access technology (RAT) and a second RAT.

8. The method of claim 7, further comprising:
communicating via the first antenna using the first RAT and the second RAT; and
communicating via the second antenna using the first RAT and the second RAT.

9. The method of claim 8, wherein communications using the first RAT and the second RAT are suspended during the silence window.

10. The method of claim 1, wherein the silence window corresponds to a measurement gap.

11. The method of claim 1, wherein the first antenna, the second antenna, or both are shared among a first radio access technology (RAT) and a second RAT, and wherein the silence window corresponds to a measurement gap for both the first RAT and the second RAT.

12. The method of claim 1, wherein the silence window corresponds to a connected mode discontinuous reception (CDRX) off duration.

13. The method of claim 1, wherein the first antenna, the second antenna, or both are shared among a first radio access technology (RAT) and a second RAT, and wherein the silence window corresponds to a window in which a connected mode discontinuous reception (CDRX) off duration of the first RAT overlaps in time with a CDRX off duration of the second RAT.

14. The method of claim 1, further comprising determining that a current active service at the UE is a voice service, the voice service having a silence interval descriptor packet, wherein the silence window corresponds to a voice silence duration associated with the silence interval descriptor packet.

15. The method of claim 1, further comprising:
determining a switch duration corresponding to a length of time to switch from the first antenna to the second antenna for communicating with the base station;
determining a silence duration corresponding to a length of time of the silence window; and
comparing the switch duration to the silence duration, wherein the switch from the first antenna to the second antenna is scheduled during the silence window in response to the silence duration being equal to or greater than the switch duration.

16. The method of claim 1, further comprising:
communicating with the base station using the first antenna and a third antenna in an uplink multiple-input-multiple-output (MIMO) configuration;
determining to switch from the first and third antennas to the second antenna and a fourth antenna for uplink communications with the base station;
scheduling the switch from the first and third antennas to the second and fourth antennas to occur during the silence window; and
switching from the first and third antennas to the second and fourth antennas during the silence window.

17. The method of claim 16, wherein determining to switch from the first antenna is independent from determining to switch from the third antenna.

18. A user equipment (UE) for wireless communication, comprising:
a first antenna;
a second antenna;
a processor;
memory coupled to the processor; and
instructions stored in the memory and operable, when executed by the processor, to cause the UE to:
communicate with a base station using the first antenna;
assess communication metrics;
determine to switch from the first antenna to the second antenna for communicating with the base station, wherein to determine to switch from the first antenna to the second antenna the instructions are operable to cause the UE to compare the communication metrics to a first threshold;
determine a silence window in which communication with the base station is suspended;
compare the communication metrics to a second threshold to determine whether to wait for the silence window to perform the switch or to perform the switch before the silence window;
determine a length of time between a determination to switch from the first antenna to the second antenna and a start of the silence window;
compare the length of time to a threshold time;
schedule the switch from the first antenna to the second antenna to occur during the silence window based at least on part on a comparison of the communication metrics to the second threshold and the length of time being less than the threshold time; and
switch from the first antenna to the second antenna during the silence window.

19. The UE of claim 18, wherein the first antenna and the second antenna are shared among a first radio access technology (RAT) and a second RAT and communications using the first RAT and the second RAT are suspended during the silence window.

20. The UE of claim 18, wherein the silence window corresponds to a measurement gap.

21. The UE of claim 18, wherein the first antenna and the second antenna are shared among a first radio access technology (RAT) and a second RAT, and wherein the silence window corresponds to a measurement gap for both the first RAT and the second RAT.

22. The UE of claim 18, wherein the silence window corresponds to a connected mode discontinuous reception (CDRX) off duration.

23. The UE of claim 18, wherein the first antenna and the second antenna are shared among a first radio access technology (RAT) and a second RAT, and wherein the silence window corresponds to a window in which a connected mode discontinuous reception (CDRX) off duration of the first RAT overlaps in time with a CDRX off duration of the second RAT.

24. The UE of claim 18, wherein the instructions are executable by the processor to cause the UE to determine that a current active service at the UE is a voice service, the voice service having a silence interval descriptor packet, wherein the silence window corresponds to a voice silence duration associated with the silence interval descriptor packet.

25. The UE of claim 18, wherein the instructions are executable by the processor to cause the UE to:
determine a switch duration corresponding to a length of time to switch from the first antenna to the second antenna for communicating with the base station;
determine a silence duration corresponding to a length of time of the silence window; and
compare the switch duration to the silence duration, wherein the instructions are executable by the processor to cause the UE to schedule the switch from the first antenna to the second antenna during the silence window in response to the silence duration being equal to or greater than the switch duration.

26. An apparatus for wireless communication, comprising:
means for communicating with a base station using a first antenna;
means for assessing communication metrics;
means for determining to switch from the first antenna to a second antenna for communicating with the base station, wherein the means for determining to switch from the first antenna to the second antenna comprises means for comparing the communication metrics to a first threshold to determine whether to switch from the first antenna to the second antenna;
means for determining a silence window in which communication with the base station is suspended;
means for comparing the communication metrics to a second threshold to determine whether to wait for the silence window to perform the switch or to perform the switch before the silence window;
means for determining a length of time between the determining to switch from the first antenna to the second antenna and a start of the silence window;
means for comparing the length of time to a threshold time;
means for scheduling the switch from the first antenna to the second antenna to occur during the silence window based at least on part on a comparison of the communication metrics to the second threshold and the length of time being less than the threshold time; and
means for switching from the first antenna to the second antenna during the silence window.

27. A non-transitory computer readable medium storing code for wireless communication, the code comprising instructions executable by a processor to:
communicate with a base station using a first antenna;
assess communication metrics;
determine to switch from the first antenna to a second antenna for communicating with the base station, wherein to determine to switch from the first antenna to the second antenna the instructions are executable by the processor to compare the communication metrics to a first threshold;
determine a silence window in which communication with the base station is suspended;
compare the communication metrics to a second threshold to determine whether to wait for the silence window to perform the switch or to perform the switch before the silence window;
determine a length of time between the determining to switch from the first antenna to the second antenna and a start of the silence window;
compare the length of time to a threshold time;
schedule the switch from the first antenna to the second antenna to occur during the silence window based at least on part on a comparison of the communication metrics to the second threshold and the length of time being less than the threshold time; and
switch from the first antenna to the second antenna during the silence window.

* * * * *